United States Patent Office 3,194,616
Patented July 13, 1965

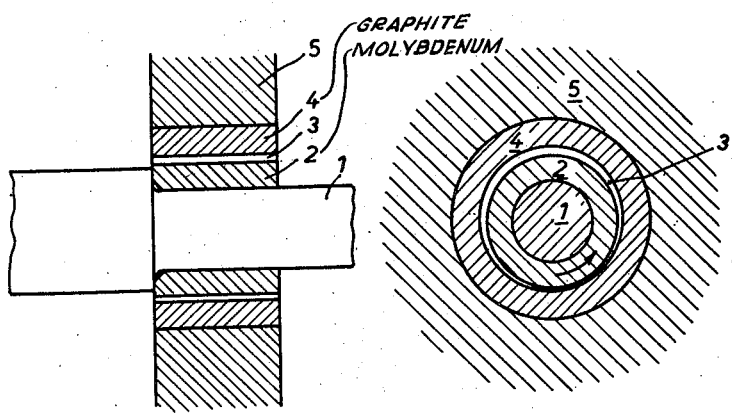

3,194,616
GAS LUBRICATED SLEEVE BEARING FOR GAS TURBINES
Ulrich Oprecht, Wittenbach, Sankt Gallen, Switzerland, assignor to Adolph Saurer Ltd., Arbon, Switzerland
Filed Jan. 28, 1963, Ser. No. 254,325
Claims priority, application Switzerland, Jan. 29, 1962, 1,071/62
2 Claims. (Cl. 308—121)

This invention relates to bearings, and more particularly to gas lubricated radial sleeve bearings for use in turbo engines, and more especially in gas turbines exposed to widely varying operational temperatures and high velocities of the rotary bearing member.

Sleeve bearings for use in gas turbines have been proposed which rely on a combination of steel and graphite, the rotary bearing portions being made of steel while the stationary parts of the bearings are made of graphite. Various expedients such as structural modifications, e.g. by the provision of multiple bearing surfaces, or feed of lubricating gas at distinct points of the circumference of the bearing, are reported to render the rotary parts non-vibratory. In spite of the fact that gas lubricated sleeve bearings of the kind noted above, usually must start dry as the lubricant becomes available only when the turbines are operating, the starting characteristics are favorable as there is but a very small, if at all noticeable, wear of the bearing surfaces which in the course of starting the turbines, are subject to dry frictional engagement with one another.

The combination of steel and graphite, however, involves the drawback that the coefficient of expansion of graphite is materially at variance with the coefficients of the kinds of steel which would be used in bearings of this kind. For graphite or compositions containing mostly graphite, the coefficient of expansion is about 5 to $6.10^{-6}$ calculated on units of length and temperature. This is less than one half of the coefficient of expansion of any steel which would be employed in this type of bearing. Nor are sleeve bearings relying on a combination of graphite and steel suitable for peripheral speeds in excess of 300 feet per second.

In bearings exposed to peripheral velocities of this magnitude, the rotary part, too, should be made of a material having a high modulus of elasticity in order to avoid any marked expansion at the high peripheral velocities. The heat conductivity of the rotary portion also should be as high as possible lest in the event of contact with the graphite surface, local high temperature concentrations occur, resulting in corresponding thermal expansion. Thus, in bearings relying on the combination of steel and graphite, a rise in temperature of 200° C. alters the clearance by about 1 percent of the diameter of the shaft. Manifestly, therefore, the combination of steel and graphite is also unsuitable for present purposes in view of the high operational temperatures encountered which would fast reduce the clearance below any permissible minimum. Moreover, the heat conductivity of any steels which could be used in the shafts, is too low.

It is an object of the present invention to provide gas lubricated sleeve bearings particularly adapted for use in gas turbines exposed to widely varying operational temperatures, including very high temperatures, and high velocities of the rotary member, which eliminate the difficulties experienced with known bearings of this type.

Other objects, and the manner in which the same are attained, will become apparent as this specification proceeds.

The present invention contemplates to provide gas lubricated sleeve bearings for use in gas turbines subject to wide variations of temperature, including very high temperatures and involving very high speeds of the rotary member, by making at least part of the rotary member of molybdenum or a composition containing mostly molybdenum, while at least part of the stationary bearing member is composed of graphite or a composition containing mostly graphite.

In a preferred embodiment of the invention, the rotary member consists of a steel shaft mounting a shrunk-on bushing made of molybdenum, while the stationary bearing portion consists of a graphite sleeve pressed into a bearing carrier or housing.

In the drawing accompanying this specification and forming part thereof, the preferred embodiment of the invention is illustrated by way of example rather than with any limitative intent.

In the drawing:

FIG. 1 is a diagrammatic section along the axis of the rotary member, of a sleeve bearing according to the invention, and FIG. 2 is a diagrammatic section transverse to the axis of the rotary member, of the bearing shown in FIG. 1.

Referring to the drawing, wherein like elements are denoted by identical reference numerals, a steel shaft 1 is seen to mount a shrunk-on bushing 2 made of molybdenum which alone constitutes the bearing portion of the rotary member. Separated by clearance indicated at 3, which normally is filled by gaseous lubricant, the bushing 2 is surrounded by the graphite sleeve 4 which is pressed into the bearing carrier or housing 5. It goes without saying that the relative dimensions of the molybdenum bushing 2 and the steel shaft 1 must be so selected that no inadmissibly high stresses can occur even under extreme conditions of operation.

In tests extending over 20 hours, bearings according to the invention have performed without noticeable wear, at rotary velocities of 36,000 r.p.m. and temperatures as high as 400° C.

In the sleeve bearings according to the present invention, the coefficient of expansion of the rotary member is substantially equal to that of the stationary bearing portion. Moreover, molybdenum is substantially unaffected by temperature variations the same as graphite. The modulus of elasticity of molybdenum is about 50 percent higher than that of steel, and its heat conductivity corresponds to that of magnesium, i.e. it is about 5 times higher than the heat conductivity of steel. Also, molybdenum is corrosion resistant up to temperatures of about 500° C., and has a materially higher strength at elevated temperatures, than steel.

I wish it to be understood that I do not desire to be limited to the details of the invention shown and described, as modifications within the scope of the appended claims and involving no departure from the spirit of the invention nor any sacrifice of the advantages thereof, may occur to workers in this field.

I claim:

1. A gas lubricated radial sleeve bearing for use in turbo engines, and particularly in gas turbines exposed to widely varying operational temperatures and high velocities of the rotary member, comprising a rotary member at least a part of which is made of a material consisting at least preponderantly of molybdenum, and a stationary member at least a part of which is made of a material consisting at least preponderantly of graphite.

2. A gas lubricated radial sleeve bearing according to claim 1, wherein the rotary member comprises a steel shaft and a molybdenum bushing shrunk on said shaft, and the stationary member comprises a graphite sleeve and a housing mounting said graphite sleeve.

References Cited by the Examiner

UNITED STATES PATENTS 693,247 2/92 Edwards.
2,627,443 2/53 Becker _____ 308—9

FOREIGN PATENTS 706,795 4/54 Great Britain.
803,084 10/58 Great Britain.

ROBERT C. RIORDON, Primary Examiner.

FRANK SUSKO, Examiner.